(12) United States Patent
Buck et al.

(10) Patent No.: US 8,806,402 B2
(45) Date of Patent: Aug. 12, 2014

(54) MODELING MULTI-PATTERNING VARIABILITY WITH STATISTICAL TIMING

(71) Applicant: International Business Machines Corporation, Armonk, NY (US)

(72) Inventors: Nathan Buck, Underhill, VT (US); Brian Dreibelbis, Underhill, VT (US); John P. Dubuque, Jericho, VT (US); Eric A. Foreman, Fairfax, VT (US); Peter A. Habitz, Hinesburg, VT (US); David J. Hathaway, Underhill, VT (US); Jeffrey G. Hemmett, Bolton Valley, VT (US); Natesan Venkateswaran, Hopewell Junction, NY (US); Chandramouli Visweswariah, Croton-on-Hudson, NY (US); Vladimir Zolotov, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/665,466

(22) Filed: Oct. 31, 2012

(65) Prior Publication Data

US 2014/0123089 A1 May 1, 2014

(51) Int. Cl.
*G06F 17/50* (2006.01)

(52) U.S. Cl.
USPC .......................................... 716/113; 716/108

(58) Field of Classification Search
CPC ............ G06F 17/5031; G06F 17/5022; G06F 17/505; G06F 17/5045; G06F 17/5036; G06F 17/5068

USPC .................................. 716/106, 108, 113, 134
See application file for complete search history.

(56) References Cited

U.S. PATENT DOCUMENTS

| 6,880,138 | B1 | 4/2005 | Teig et al. |
|---|---|---|---|
| 7,475,377 | B2 | 1/2009 | Yamada |
| 8,019,458 | B2 | 9/2011 | Funk et al. |
| 8,069,423 | B2 | 11/2011 | Ghan et al. |
| 8,180,621 | B2 | 5/2012 | Phillips |
| 2002/0156609 | A1* | 10/2002 | Hirata et al. ..................... 703/14 |
| 2004/0058255 | A1 | 3/2004 | Jessen et al. |
| 2007/0061771 | A1* | 3/2007 | Habitz et al. ..................... 716/21 |
| 2011/0139982 | A1 | 6/2011 | Kijima et al. |
| 2012/0035878 | A1 | 2/2012 | Phatak |
| 2013/0094035 | A1 | 4/2013 | Chang et al. |

OTHER PUBLICATIONS

Ausschnitt, C.P., "Multi-Patterning Overlay Control", SPIE Digital Library vol. 6924, 2008, 5 pages.
Unknown, "Comprehensive Multi-Patterning Support: Calibre Multi-Patterning", www.mentor.com, 2011, 3 pages.

(Continued)

*Primary Examiner* — Vuthe Siek
(74) *Attorney, Agent, or Firm* — David Cain; Roberts Mlotkowski Safran & Cole, P.C.

(57) ABSTRACT

Systems and methods for modeling multi-patterning variability with statistical timing analysis during IC fabrication are described. The method may be provided implemented in a computer infrastructure having computer executable code tangibly embodied on a computer readable storage medium having programming instructions operable to define at least one source of variation in an integrated circuit design. The programming instructions further operable to model the at least one source of variation for at least two patterns in at least one level of the integrated circuit design as at least two sources of variability respectively.

11 Claims, 4 Drawing Sheets

(56) References Cited

OTHER PUBLICATIONS

Englard et al., "Accurate In-Resolution Level Overlay Metrology for Multi-Patterning Lithography Techniques", SPIE Digital Library vol. 6922, 2008, 9 pages.

Jeong et al., "Timing Analysis and Optimization Implications of Bimodal CD Distribution in Double Patterning Lithography", IEEE, 2009, pp. 486-491.

Poutous et al., "Correlation of Fabrication Tolerances with the Performance of Guided-Mode-Resonance Micro-optical Components", Proc. of SPIE vol. 7205, 2009, 9 pages.

Kahng, "The Future of Signoff", TAU 2011 Keynote, UCSD VLSI CAD Laboratory, 2011, 52 pages.

Office Action dated Jan. 22, 2014 in related U.S. Appl. No. 13/665,276, 9 pages.

Notice of Allowance dated Feb. 20, 2014 in related Application No. 13/665,315, 6 pages.

Office Action dated Nov. 4, 2013 in related U.S. Appl. No. 13/665,315, 7 pages.

Jeong et al., Assessing Chip-Level Impact of Double Patterning Lithography, 2010, IEEE, pp. 122-130.

Jeong et al., A Framework for Chip-Level Evaluation of Misaligment and Linewidth Error Impacts Across Double-Patterning Technology Otion, 2010, pp. 1-8.

\* cited by examiner

MODELING MULTI-PATTERNING VARIABILITY WITH STATISTICAL TIMING

FIELD OF THE INVENTION

The invention relates to systems and methods for integrated circuit ("IC") fabrication and optimization and, more particularly, to systems and methods for modeling multi-patterning variability with statistical timing during IC fabrication.

BACKGROUND

An IC is a device (e.g., a semiconductor device) or electronic system that includes many electronic components, such as transistors, resistors, diodes, etc. These components are often interconnected to form multiple circuit components, such as gates, cells, memory units, arithmetic units, controllers, decoders, etc. An IC includes multiple layers of wiring that interconnect its electronic and circuit components.

Design engineers design ICs by transforming logical or circuit descriptions of the ICs' components into geometric descriptions, called design layouts. IC design layouts typically include circuit modules (e.g., geometric representations of electronic or circuit IC components) with pins, and interconnect lines (e.g., geometric representations of wiring) that connect the pins of the circuit modules. A net is typically defined as a collection of pins that need to be connected. In this fashion, design layouts often describe the behavioral, architectural, functional, and structural attributes of the IC. To create the design layouts, design engineers typically use electronic design automation ("EDA") applications. These applications provide sets of computer-based tools for creating, editing, analyzing, and verifying design layouts.

ICs are manufactured based on the design layouts using a photolithographic process. Photolithography is an optical printing and fabrication process by which patterns on a photolithographic mask (i.e., photomask) are imaged and defined onto a photosensitive layer coating a substrate. To manufacture an IC, photomasks are created using the IC design layout as a template. The photomasks contain the various geometries (e.g., features) of the IC design layout. The various geometries contained on the photomasks correspond to the various base physical IC elements that comprise functional circuit components such as transistors, interconnect wiring, via pads, as well as other elements that are not functional circuit elements but that are used to facilitate, enhance, or track various manufacturing processes. Through sequential use of the various photomasks corresponding to a given IC in an IC fabrication process, a large number of material layers of various shapes and thicknesses with various conductive and insulating properties may be built up to form the overall IC and the circuits within the IC design layout.

As circuit complexity continues to increase and transistor designs become more advanced and ever smaller in size (i.e., die shrink), multi-patterning photolithographic technologies or processes are more often being used to manufacture ICs. Specifically, multi-patterning is a class of lithographic technologies or processes for manufacturing ICs to enhance feature density. The simplest case of multi-patterning is double patterning, where a conventional lithography process is enhanced to produce double the expected number of features. Multi-patterning photolithographic technologies or processes typically require the use of a plurality of different photomasks to form the geometric representations of the electronic or circuit IC components within the IC design layout. The different photomasks typically have different variations and misalignments such that parameters of the electronic or circuit IC components (e.g., transistors and wires) fabricated with the different photomasks may vary differently (e.g., multimodal variability or a distribution of variability for each mask).

Timing analysis (e.g., statistical static timing analysis (SSTA)) needs to model this variation in parameters of the electronic or circuit IC components caused by the multi-patterning technologies or process in an efficient and effective manner. Most SSTA solutions use a sensitivity-based approach to model the effect of variation on timing. This involves establishing how change in a particular device or interconnect parameter affects a desired property of the integrated circuit. This sensitivity to the parameter, in conjunction with its probability distribution (mean and standard deviation), provides a statistical model describing the probability that a parameter will have a certain effect on a device or interconnect property.

However, multimodal variability is difficult to model using conventional SSTA solutions that rely on single Gaussian distributions. For example, previous solutions have included modeling the variability as a single distribution or as a bimodal distribution. The single distribution solution typically models width/spacing as a single distribution that matches mean and variance but results in pessimistic timing result. The bimodal distribution cannot model equipment variability and variability from different sets of photomasks and thus results in very long model run times and inaccurate results.

Accordingly, there exists a need in the art to overcome the deficiencies and limitations described hereinabove.

SUMMARY

In a first aspect of the invention, a method is provided implemented in a computer infrastructure having computer executable code tangibly embodied on a computer readable storage medium having programming instructions operable to define at least one source of variation in an integrated circuit design. The programming instructions further operable to model the at least one source of variation for at least two patterns in at least one level of the integrated circuit design as at least two sources of variability respectively.

In another aspect of the invention, a method is provided for optimizing a design layout of an integrated circuit. The method comprises querying fabrication measurements associated with the at least one source of variation for at least two patterns in at least one level of the integrated circuit design. The method further comprises determining from the fabrication measurements if a distribution has shifted based upon a currently applied distribution. The method also comprises asserting canonical shift and/or scale to random variables to model a difference in distributions. The method further comprises optimizing the design layout of the integrated circuit based on the model of difference in distributions. The querying the fabrication measurements is performed using a processor.

In another aspect of the invention, a method is provided for optimizing a design layout of an integrated circuit. The method comprises querying fabrication measurements associated with the at least one source of variation for at least two patterns in at least one level of the integrated circuit design. The method further comprises defining a correlation coefficient for the at least one level of the integrated circuit design based on the fabrication measurements. The method also comprises modeling a difference in distributions based on the correlation coefficient. The method further comprises optimizing the design layout of the integrated circuit based on the model of difference in distributions. The querying the fabrication measurements is performed using a processor.

In yet another aspect of the invention, a computer system is provided for modeling multi-patterning variability. The system comprises a CPU, a computer readable memory, and a computer readable storage media. The system further comprises first program instructions for defining at least one source of variation in an integrated circuit design. The system further comprises second program instructions for modeling the at least one source of variation for at least two patterns in at least one level of the integrated circuit design as at least two sources of variability respectively. The first and second program instructions are stored on the computer readable storage media for execution by the CPU via the computer readable memory.

BRIEF DESCRIPTION OF THE SEVERAL VIEWS OF THE DRAWINGS

The present invention is described in the detailed description, which follows, in reference to the noted plurality of drawings by way of non-limiting examples of exemplary embodiments of the present invention.

DETAILED DESCRIPTION

Figure 1:
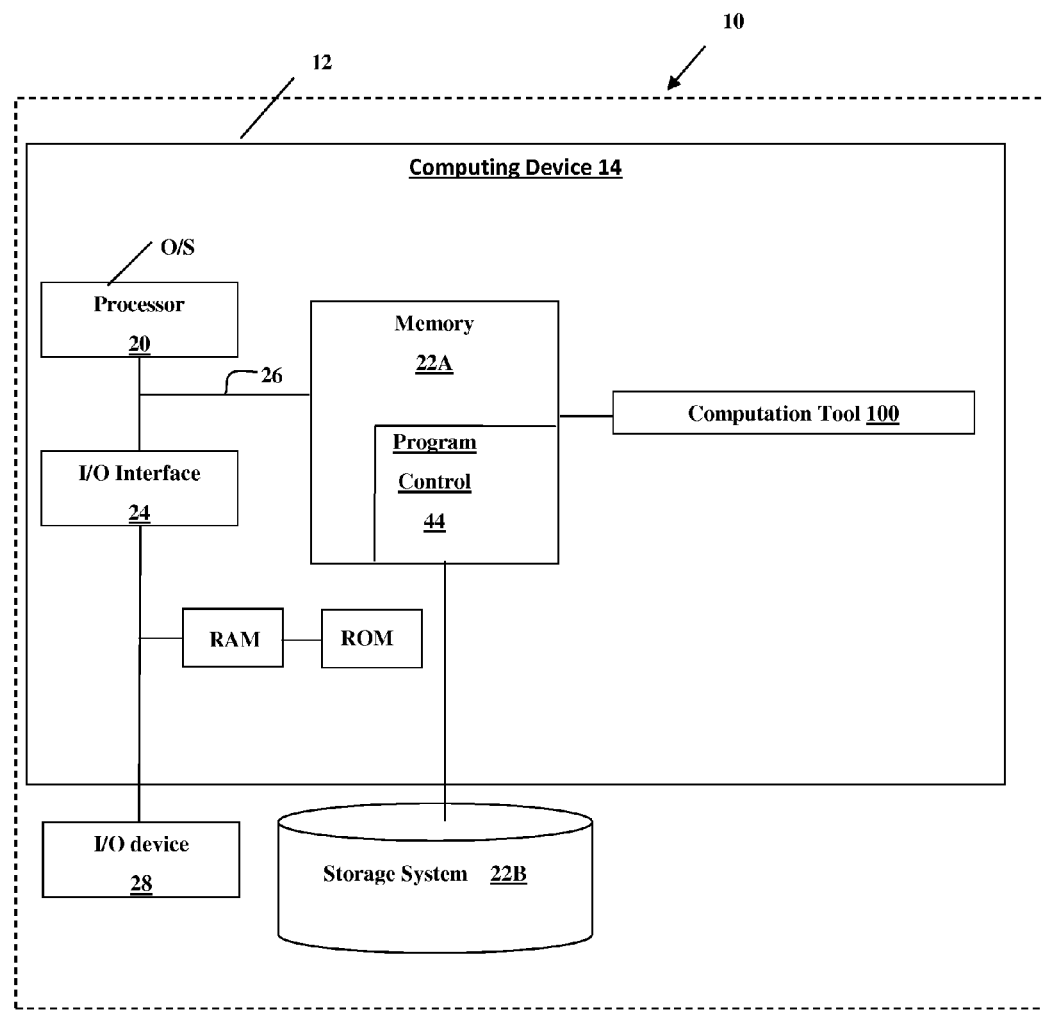
FIG. 1 is an illustrative external environment for implementing the invention in accordance with aspects of the invention.

The invention relates to systems and methods for IC fabrication and optimization and, more particularly, to systems and methods for modeling multi-patterning variability with statistical timing during IC fabrication. More specifically, implementations of the invention provide systems and methods for modeling variability in semiconductor patterns by modeling a pattern variable as multiple sources of variability for each pattern, using fabrication measurements queried for each level of the IC design. In embodiments, correlation coefficients can be computed for each level of the IC design to provide a more accurate modeling of the multi-patterning variability. In additional embodiments, the modeling of the variability in multi-patterning and the correlation coefficients can be used in conjunction with SSTA to perform optimization of the physical layout of the IC design.

Advantageously, in embodiments, the systems and methods of the present invention allow for simple models to be generated that are compatible with statistical timing analysis. Also advantageously, in embodiments, the systems and methods of the present invention capture the effects of bimodal pattern shape distribution for intra-chip variations and correlations between different pattern shapes can be computed from queried fabrication measurements. Also advantageously, the techniques of the present invention provide input for optimizing placement of multi-patterning with respect to the physical design layout of the IC.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls a computation tool 100, e.g., at least a portion of an EDA application, which performs the processes described herein. The computation tool 100 can be implemented as one or more program code in the program control 44 stored in memory 22A as separate or combined modules. Additionally, the computation tool 100 may be implemented as separate dedicated processors or a single or several processors to provide the function of these tools.

In embodiments, the computation tool 100 may be configured to define at least one source of variation in an integrated circuit design and model the at least one source of variation for at least two patterns in at least one level of the integrated circuit design as at least two sources of variability respectively. In additional embodiments, the computation tool 100 may be further configured to query fabrication measurements associated with the at least one source of variation for the at least two patterns in the at least one level of the integrated circuit design, determine from the fabrication measurements if a distribution has shifted based upon a currently applied distribution, assert a canonical shift and/or scale to random variables to model a difference in distributions, and optimize the design layout of the integrated circuit based on the model of difference in distributions.

While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Flow Diagram

Figure 2:
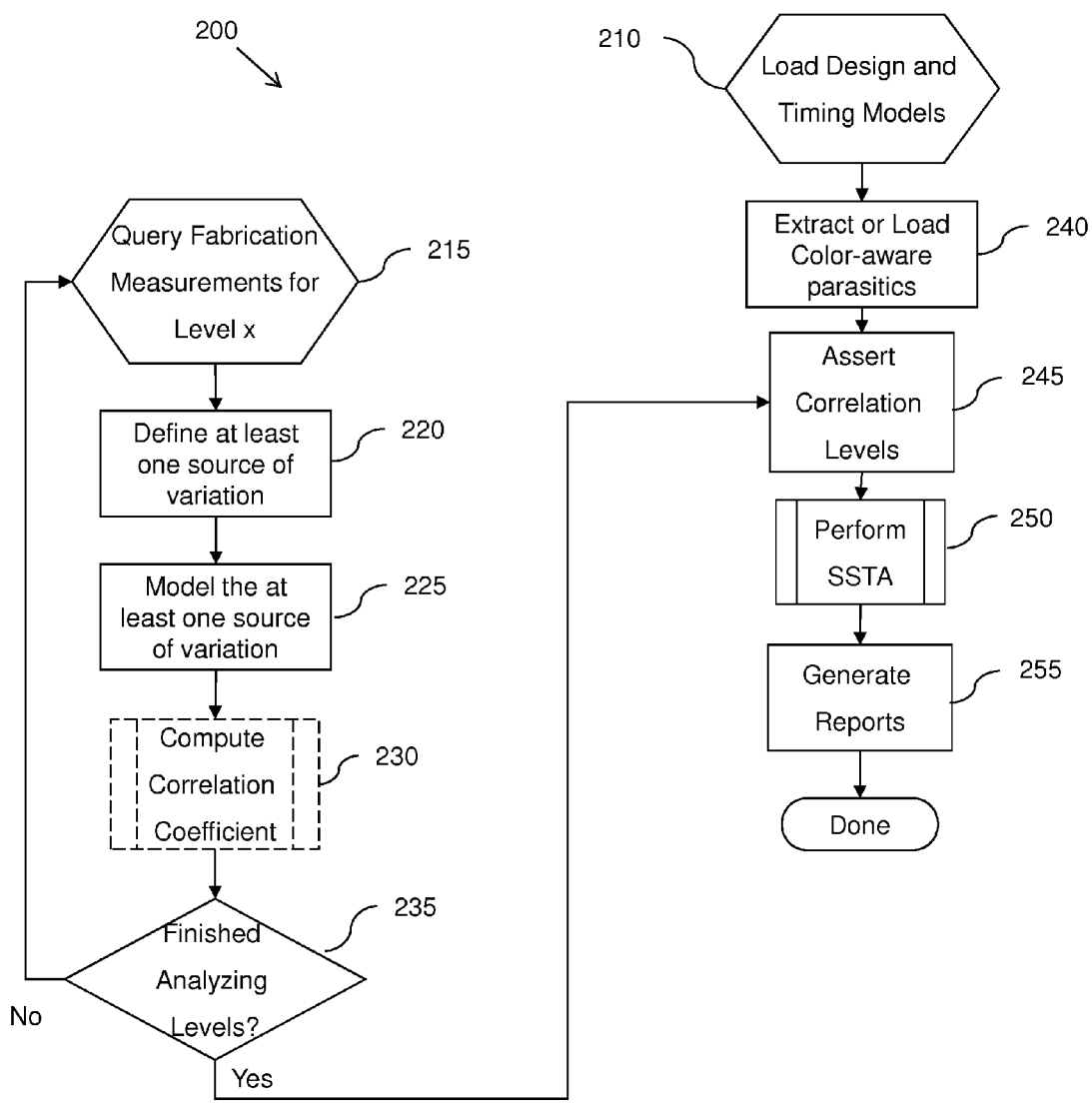
FIGS. 2 and 3 are illustrative process flows for implementing the system in accordance with aspects of the invention.
Figure 3:
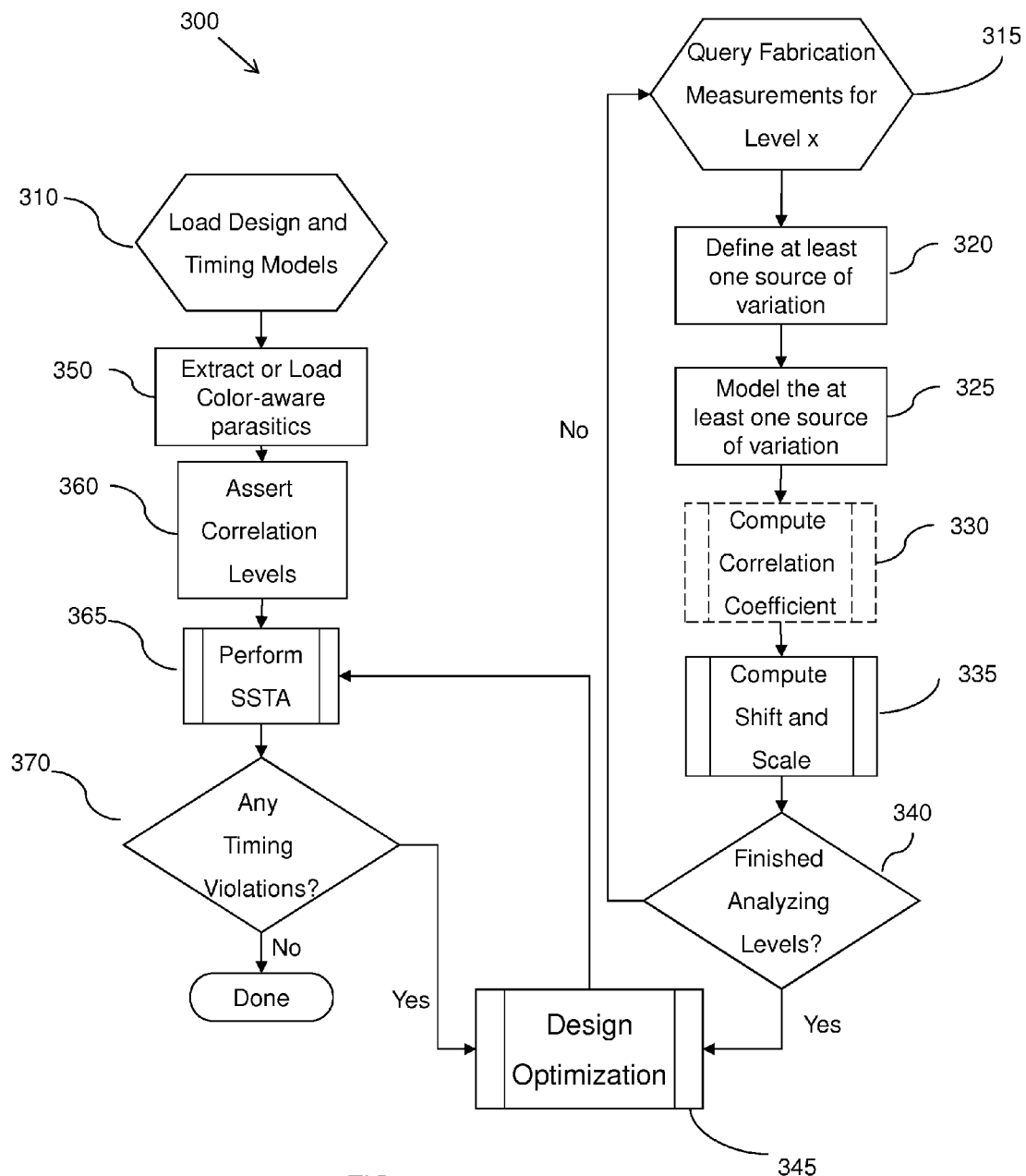

FIGS. 2 and 3 show exemplary flows for performing aspects of the present invention. The steps of FIGS. 2 and 3 may be implemented in the environment of FIG. 1, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

In embodiments, as shown in FIG. 2, a process 200 is provided for modeling multi-patterning variability. At step 210, design and timing models for an IC or specified testing region of the IC may be loaded into a computing device. For example, a design layout and timing models for at least one circuit path of an IC or a specified region of the IC may be loaded into the computation tool 100 (as discussed with respect to FIG. 1). The design and timing models for the IC may be found or provided by a designer of the IC.

At step 215, fabrication measurements for each layer or level of the IC are queried from the design and timing models for the IC. In embodiments, the queried fabrication measurements may be separated into separate sets for each pattern or photomask used to fabricate each layer or level of the IC. For example, a width of a first pattern used to fabricate a first layer is separated into a separate set from that of a width of a second pattern used to also fabricate the first layer.

At step 220, at least one source of variation in the IC design is defined as a parameter. In embodiments, the computation for modeling the multi-patterning variability may take into consideration multiple sources of variation due to the multi-patterning by defining a separate parameter for each pattern. In accordance with aspects of the invention, the parameter (e.g., a value that is in some way controlled, provided in advance, or kept constant within the IC design) defined for each pattern or photomask, which could also be a vector of parameters (e.g., a set of parameters that form a vector), may include width, registration, rotation, etc. For example, width of a pattern may be defined as a source of variation in the IC design.

In additional embodiments, parameters may be combined and collapsed. For example: (i) registration and rotation could be combined as a displacement parameter, (ii) parameters may be collapsed for local paths, (iii) registrations at the top of long paths could be defined as different parameters, and/or (iv) rotation (e.g., rotation with up to an including four degrees of freedom may be provided) and the center of the rotation may be defined as parameters.

Furthermore, capacitance of wiring layers could be expressed as a function of both a first parameter for a first pattern and a second parameter for a second pattern, depending on whether the wiring layers are in close proximity to other patterns. The wiring layers in the middle of the IC design may have less affect on a specified pattern than wiring layers on the outside of the IC design. Additionally, the parameters could be defined to have higher order sensitivities, e.g., the capacitance may not linearly relate to other patterns around a specified patterns.

In addition, relative spatial relationships could be defined for parameter reduction. For example, a parameter could be defined based on a first pattern shift relative to a second pattern, rather than a first and second pattern shift relative to some fixed point. In embodiments, some parameters may be collapsed (e.g., two registration parameters for a double pattern could be collapsed to one). However, generally the parameters should not be collapsed, particularly, when there are more than two patterns.

At step 225, the at least one source of variation may be modeled for at least two patterns in at least one level of the IC design as at least two sources of variability respectively. For example, the width of a first pattern for a first level of the IC design may be modeled as a first source of variation and the width of a second pattern for the first level of the IC design may be modeled as the second source of variation. In embodiments, the modeling may comprise modeling the corresponding widths for the first pattern and the second pattern for the first level as two sources of variation using the following equations (1) and (2).

$$W_R = W_{R,0} + \Delta W_{R,Glob} + \Delta W_{R,Spat} + \Delta W_{R,Rand} \quad (1)$$

$$W_G = W_{G,0} + \Delta W_{G,Glob} + \Delta W_{G,Spat} + \Delta W_{G,Rand} \quad (2)$$

$W_R$ is the width parameter calculated for the first pattern of the first layer, wherein $W_{R,0}$ is the mean distribution for the width of the first pattern, $\Delta W_{R,Glob}$ is the sensitivity to global distribution for the width of the first pattern, $\Delta W_{R,Spat}$ is the sensitivity to spatial distribution for the width of the first pattern, and $\Delta W_{R,Rand}$ is the sensitivity to random distribution for the width of the first pattern. $W_G$ is the width parameter calculated for the second pattern of the first layer, wherein $W_{G,0}$ is the mean distribution for the width of the second pattern, $\Delta W_{G,Glob}$ is the sensitivity to global distribution for the width of the second pattern, $\Delta W_{G,Spat}$ is the sensitivity to spatial distribution for the width of the second pattern, and $\Delta W_{G,Rand}$ is the sensitivity to random distribution for the width of the second pattern.

In embodiments, the random and spatial terms of variability may be extracted by conventional techniques or since typically multiple patterns of a same level have a same amount of random and spatial variability, these terms may be assumed as equal to zero. The global terms of variability may be extracted by conventional techniques. The mean values of pattern variability are extracted from the queried fabrication measurements by conventional techniques. As should be understood by one of ordinary skill in the art, the sensitivities can be used in conjunction with the mean distribution to provide a full distribution for each parameter. The sensitivities can be either linear or nonlinear depending on the device parameter. Advantageously, the calculated parameters capture the effect of multimodal variability or a distribution of variability for each pattern.

Optionally at step 230, a correlation coefficient for at least one level of the IC design may be defined or computed based on the queried fabrication measurements. The correlation coefficient may then be used to more accurately model the sources of variation in the patterning of the at least one level of the IC design. For example, the parameters for the patterning in one level of the IC design may be uncorrelated, but if the parameters are correlated, then it may be useful to define or calculate that correlation to improve accuracy of the modeling.

Specifically, if the patterning in one level of the IC design has some correlation during manufacturing such that there is tracking between the patterning, the tracking can be measured by taking samples of the disruption for each pattern and computing a standard deviation, covariance, and a correlation coefficient for the correlation between the patterns.

In embodiments, the calculations to determine whether there is correlation between the patterning and the calculations to compute the correlation coefficient may comprise using equations (3)-(5).

$$E(\Delta w_{R,Glob} - \Delta w_{G,Glob})^2 = \qquad (3)$$
$$E(\Delta w_{R,Glob})^2 + E(\Delta w_{G,Glob})^2 - 2E(\Delta w_{R,Glob}\Delta w_{G,Glob})$$

$$\rho = \frac{\sigma_R^2 + \sigma_G^2 - \sigma_{R-G}^2}{2\sigma_R\sigma_G} \qquad (4)$$

$$\text{if } \sigma_R = \sigma_G = \sigma \quad \rho = \frac{2\sigma^2 - \sigma_{R-G}^2}{2\sigma^2} = 1 - \frac{\sigma_{R-G}^2}{2\sigma^2} \qquad (5)$$

In covariance equation (3), the expectation (E) of the difference between a first pattern $\Delta W_{R,Glob}$ and a second pattern $\Delta W_{G,Glob}$ is equal to the expected value (E) of the sum of the two squares of the first pattern $\Delta W_{R,Glob}$ and the second pattern $\Delta W_{G,Glob}$ minus two times the expected value (E) of the covariance between the two patterns $\Delta W_{R,Glob}$ and $\Delta W_{G,Glob}$. If the calculated expectation (E) of the difference between the first pattern $\Delta W_{R,Glob}$ and the second pattern $\Delta W_{G,Glob}$ is equal to zero then the two patterns are uncorrelated. However, if the calculated expectation (E) is equal to some value other than zero, then a correlation between the patterning exists, and equations (4) and (5) may be used to calculate the correlation coefficient.

In equation (4) the correlation coefficient ($\rho$) is set equal to the standard deviation of pattern (R) plus the standard deviation of pattern (G) minus the standard deviation ($\sigma$) of the covariance between the two patterns (R and G) divided by two times the product of the standard deviation of the two patterns (R and G). However, if the standard deviation of pattern (R) is equal to the standard deviation of the pattern (G), then the correlation coefficient ($\rho$) may be set equal to one minus the standard deviation ($\sigma$) of the covariance between the two patterns (R and G) divided by two times the standard deviation, as shown in equation (5).

At step 235, a determination is made as to whether all of the levels of the IC design have been evaluated for multi-patterning variability. If all of the levels have been evaluated, then the process continues to step 245. If all of the levels have not been evaluated, then the process returns to step 215, and the next level of the IC design is selected for evaluation.

At step 240, parasitics for the IC design may be loaded or extracted into the computing device. For example, a parasitic technology file for the IC design may be loaded into the computation tool 100 (as discussed with respect to FIG. 1). The parasitic technology file may be generated such that the file comprises all process technology parameters that describe electrical behavior for regions of the IC chip. In embodiments, the parasitic technology file may be generated as a color-aware or pattern-aware parasitic file such that the parasitic technology file may include multi-patterning sources of variation for each resistance solution and capacitance solution captured during the parasitic extraction. For example, the parasitic technology file may be generated by performing a base parasitic extraction, capturing a multi-patterning source for each piece of each parasitic value, determining sensitivities to underlying variational parameters for each of the enumerated multi-patterning sources of a parasitic value, and generating final statistical parasitics by multiplying each piece of each base parasitic value by the corresponding sensitivity(s). (See, e.g., U.S. application Ser. No. 13/665, 315, filed on Oct. 31, 2012, which is incorporated herein by reference in its entirety.)

At step 245, the correlated levels comprising multi-patterning for the IC design are asserted into a SSTA for the IC design. For example, the generated models for the multi-patterning for each level of the IC design are incorporated into a SSTA. In embodiments, the models may be incorporated into the SSTA such that the canonical model of the IC design is updated with sensitivity to the parameters of the multi-patterning. For example, the difference of mean values $W_{R,0} - W_{G,0}$ models constant systematic difference between the two pattern widths. The random terms $\Delta W_{R,Rand}$ and $\Delta W_{G,Rand}$ contribute to independent random variation of delays and slews. The spatial terms $\Delta W_{R,spat}$ and $\Delta W_{G,spat}$ contribute to spatial variations of delays and slews. The global variations $\Delta W_{R,Glob}$ and $\Delta W_{G,Glob}$, model chip to chip variability of the two pattern widths.

In accordance with aspects of the invention, the delay throughout the book for the IC design may be calculated as $D_A$. In embodiments, the delay ($D_A$) may be added to the canonical model of the IC design. For example, the delay ($D_A$) may be calculated using equation (6).

$$D_A = M_0 + S_R\Delta S_R + S_G\Delta S_G + \ldots + S_n\Delta S_n \qquad (6)$$

where $M_0$ is the mean and $S_R\Delta S_R + S_G\Delta\Delta S_G$ is the delay for one level of the IC design, which incorporates the sensitivities (S) for the two patterns (R and G). Advantageously, updating the canonical model of the IC design with the sensitivities to the parameters of the multi-patterning allows for detailed cancellation, root sum squaring (RSSing), and correlation during the IC design process.

At step 250, a SSTA may be computed for a netlist of the at least one circuit path of the IC or a specified region of IC. In accordance with aspects of the invention, the SSTA may be computed to model the effect of possible multi-patterning variation in the IC or the specified region of the IC on the timing of the at least one circuit path. As discussed above, this may include establishing how multi-patterning variation in a particular device, such as pattern width, affects a desired property of the IC, such as slew or capacitance of the IC. It is possible to subsequently use the parameter variation information for a timing analysis by generating the above-described multi-patterning models, which define sensitivities to these parameters. For the IC or the specified region of the IC, these sensitivities represent how the change in a particular parameter affects delay, slew, setup, hold, resistance, capacitance, etc.

Once the sensitivities to these parameters are defined, an SSTA engine, e.g., computation tool 100 (as described above with respect to FIG. 1), can then compute all arrival times (ATs), required arrival times (RATs), and slacks for nodes of the IC or the specified region of the IC.

At step 255, reports may be generated. For example, the computation tool 100 may generate reports comprising any timing quantity including the RATs, the ATs, the slack projection, and the transition time or slew rate for the design structure obtained from the SSTA.

In embodiments, as shown in FIG. 3, a process 300 is provided for modeling multi-patterning variability and optimizing a design layout of an IC. At step 310, design and timing models for an IC or specified testing region of the IC may be loaded into a computing device. For example, a design layout and timing models for at least one circuit path of an IC or a specified region of the IC may be loaded into the computation tool 100 (as discussed with respect to FIG. 1). The design and timing models for the IC may be found or provided by a designer of the IC.

At step 315, fabrication measurements for each layer or level of the IC are queried from the design and timing models for the IC. In embodiments, the queried fabrication measurements may be separated into separate sets for each pattern or photomask used to fabricate each layer or level of the IC. For example, a width of a first pattern used to fabricate a first layer is separated into a separate set from that of a width of a second pattern used to also fabricate the first layer.

At step 320, at least one source of variation in the IC design is defined as a parameter, as discussed in detail above with respect to FIG. 2. In embodiments, the computation for modeling the multi-patterning variability may take into consideration multiple sources of variation due to the multi-patterning by defining a separate parameter for each pattern. In accordance with aspects of the invention, the parameter defined for each pattern or photomask, which could also be a vector of parameters, may include width, registration, rotation, etc. For example, width of a pattern may be defined as a source of variation in the IC design.

At step 325, the at least one source of variation may be modeled for at least two patterns in at least one level of the IC design as at least two sources of variability respectively, as discussed above in detail with respect to FIG. 2. For example, the width of a first pattern for a first level of the IC design may be modeled as a first source of variation and the width of a second pattern for the first level of the IC design may be modeled as the second source of variation.

Optionally at step 330, a correlation coefficient for at least one level of the IC design may be defined or computed based on the queried fabrication measurements. The correlation coefficient may then be used to more accurately model the sources of variation in the patterning of the at least one level of the IC design, as discussed in detail above with respect to FIG. 2. For example, if the patterning in one level of the IC design has some correlation during manufacturing such that there is tracking between the patterning, the tracking can be measured by taking samples of the disruption for each pattern and computing a standard deviation, covariance, and a correlation coefficient for the correlation between the patterns.

At step 335, shift and scale factors that modify the at least one source of variation for the at least one level of the IC design may be defined based on the queried fabrication measurements. For example, the queried fabrication measurements may be used to determine if distribution between the patterning of each level of the IC design has shifted or scaled based upon a currently applied distribution. If the distribution has shifted, then the canonical shift and scale factors may be defined and asserted to random variables to model the difference in the distribution between the patterning of each level of the IC design.

At step 340, a determination is made as to whether all of the levels of the IC design have been evaluated for multi-patterning variability. If all of the levels have been evaluated, then the process continues to step 345. If all of the levels have not been evaluated, then the process returns to step 315, and the next level of the IC design is selected for evaluation.

At step 345, the design layout of the IC may be optimized based on the models of difference in distributions. For example, the design layout of the IC may be optimized by changing the physical design layout of the IC based upon the specific random variables for the patterns in order to minimize the random variable sensitivity. In embodiments, the queried fabrication measurement data may be used as input during the optimization process to generate the physical design layout changes.

At step 350, parasitics for the IC design may be loaded or extracted into the computing device. For example, a parasitic technology file for the IC design may be loaded into the computation tool 100 (as discussed with respect to FIG. 1). The parasitic technology file may be generated such that the file comprises all process technology parameters that describe electrical behavior for regions of the IC chip. In embodiments, the parasitic technology file may be generated as a color-aware or pattern-aware parasitic file such that the parasitic technology file may include multi-patterning sources of variation for each resistance solution and capacitance solution captured during the parasitic extraction, as described above. (See, e.g., U.S. application Ser. No. 13/665, 315, filed on Oct. 31, 2012, which is incorporated herein by reference in its entirety.)

At step 360, the correlated levels comprising multi-patterning for the IC design are asserted into a SSTA for the IC design. For example, the generated models for the multi-patterning for each level of the IC design are incorporated into a SSTA. In embodiments, the models may be incorporated into the SSTA such that the canonical model of the IC design is updated with sensitivity to the parameters of the multi-patterning, as discussed in detail above with respect to FIG. 2.

At step 365, an SSTA may be computed for a netlist of the at least one circuit path of the IC or a specified region of IC. In accordance with aspects of the invention, the SSTA may be computed to model the effect of possible multi-patterning variation in the IC or the specified region of the IC on the timing of the at least one circuit path. As discussed above, this may include establishing how multi-patterning variation in a particular device, such as pattern width, affects a desired property of the IC, such as slew or capacitance of the IC. It is possible to subsequently use the parameter variation information for a timing analysis by generating the above-described multi-patterning models, which define sensitivities to these parameters. For the IC or the specified region of the IC, these sensitivities represent how the change in a particular parameter affects delay, slew, setup, hold, resistance, capacitance, etc.

Once the sensitivities to these parameters are defined, an SSTA engine, e.g., computation tool 100 (as described above with respect to FIG. 1), can then compute all arrival times (ATs), required arrival times (RATs), and slacks for nodes of the IC or the specified region of the IC.

At step 370, a determination is made as to whether there is any timing violations based on the results of the SSTA. If there are no timing violations, then the process ends. If there are timing violations, then the process returns to step 345, and the physical design layout of the IC is optimized in accordance with conventional techniques in order to improve the IC design and achieve timing requirements for the IC design.

Figure 4:
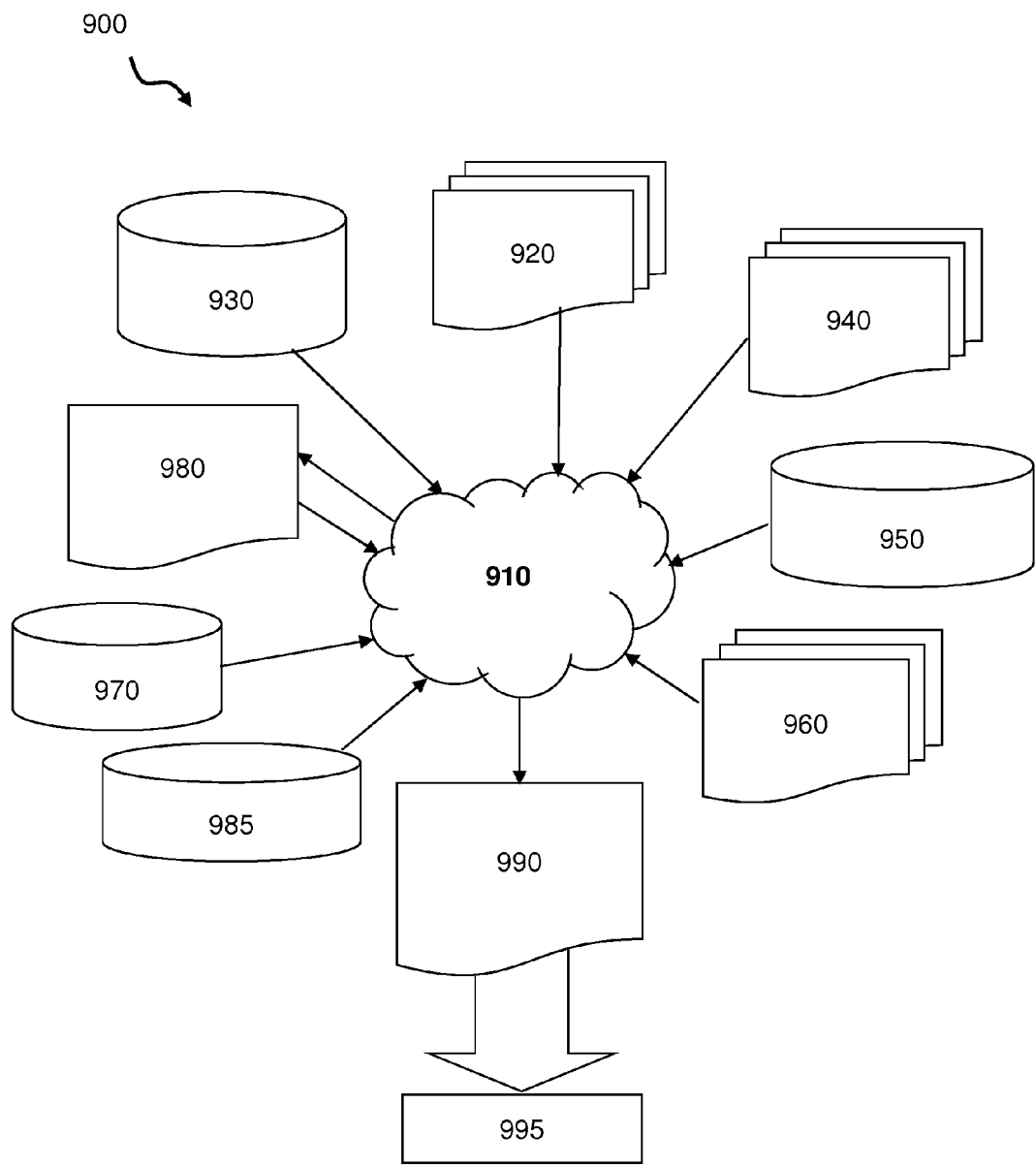
FIG. 4 is a flow diagram of a design process used in semiconductor design, manufacture, and/or test.

FIG. 4 is a flow diagram of a design process used in semiconductor design, manufacture, and/or test used with the system and method of the present invention. FIG. 4 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 4 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system, which can be implemented with the method and system of the present invention. As such, design structure 920 may comprise files or other data structures including human and/or machine-readable source code, compiled structures, and computer-executable code structures that when processed by a design or simulation data processing system functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 that may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990.

Design structure 990 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more devices. In one embodiment, design structure 990 may comprise a compiled, executable HDL simulation model that functionally simulates the devices.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure. Design structure 990 may then proceed to a stage 995 where, for example, design structure 990: proceeds to tape-out, is released to manufacturing, is released to a mask house, is sent to another design house, is sent back to the customer, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method comprising:
   querying fabrication measurements associated with at least one source of variation for at least one level of an integrated circuit design;
   defining the at least one source of variation in the integrated circuit design;
   modeling the at least one source of variation for at least two patterns in at least one level of the integrated circuit design as at least two sources of variability respectively; and
   defining shift and scale factors that modify the at least one source of variation for the at least one level of the integrated circuit design based on the fabrication measurements,
   wherein the modeling is performed by at least one computing device, and
   the modeling comprises using the shift and scale factors to model the at least two sources of variability.

2. The method of claim 1, further comprising
   defining a correlation coefficient for the at least one level of the integrated circuit design based on the fabrication measurements,
   wherein the modeling comprises using the correlation coefficient to model the at least two sources of variability.

3. The method of claim 2, further comprising:
   extracting parasitics; and
   performing a statistical static timing analysis (SSTA) of the integrated circuit design using the models of the at least two sources of variability and the parasitics.

4. The method of claim 3, wherein the parasitics are color-aware parasitics.

5. The method of claim 1, wherein the at least two patterns are created with at least two different photomasks.

6. The method of claim 1, further comprising generating reports that include the at least two sources of variability.

7. A method comprising:
   defining at least one source of variation in an integrated circuit design: and
   modeling the at least one source of variation for at least two patterns in at least one level of the integrated circuit design as at least two sources of variability respectively,
   wherein the at least two sources of variability each comprise a mean distribution for the at least one source of variation, a sensitivity to global distribution for the at least one source of variation, a sensitivity to spatial distribution for the at least one source of variation, and a sensitivity to random distribution for the at least one source of variation, and
   wherein the modeling is performed by at least one computing device.

8. A computer system for modeling multi-patterning variability, the system comprising:
   a CPU, a computer readable memory, and a computer readable storage media;
   first program instructions for querying fabrication measurements associated with at least one source of variation for at least one level of the integrated circuit design:
   second program instructions for defining the at least one source of variation in the integrated circuit design;
   third program instructions for modeling the at least one source of variation for at least two patterns in at least one level of the integrated circuit design as at least two sources of variability respectively; and
   fourth program instructions for defining shift and scale factors that modify the at least one source of variation for the at least one level of the integrated circuit design based on the fabrication measurements,
   wherein the first, second, third, and fourth program instructions are stored on the computer readable storage media for execution by the CPU via the computer readable memory, and
   the modeling comprises using the shift and scale factors to model the at least two sources of variability.

9. The system of claim 8, further comprising
   fifth program instructions for defining a correlation coefficient for the at least one level of the integrated circuit design based on the fabrication measurements,
   wherein the modeling comprises using the correlation coefficient to model the at least two sources of variability.

10. The system of claim 8, further comprising:
    fifth program instructions for extracting parasitics; and
    sixth program instructions for performing a statistical static timing analysis (SSTA) of the integrated circuit design using the model of the at least two sources of variability and the parasitics.

11. The system of claim 10, wherein the parasitics are color-aware parasitics.

* * * * *